United States Patent
Hsu

(10) Patent No.: US 9,357,377 B2
(45) Date of Patent: May 31, 2016

(54) METHOD OF MANAGING E-UTRA FUNCTION OF USER EQUIPMENT AND RELATED WIRELESS COMMUNICATION SYSTEM

(71) Applicant: ACER INCORPORATED, New Taipei (TW)

(72) Inventor: Chu-Hsiang Hsu, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

(21) Appl. No.: 14/517,909

(22) Filed: Oct. 19, 2014

(65) Prior Publication Data

US 2015/0156698 A1 Jun. 4, 2015

Related U.S. Application Data

(60) Provisional application No. 61/911,482, filed on Dec. 4, 2013.

(30) Foreign Application Priority Data

May 5, 2014 (TW) .............................. 103115991 A

(51) Int. Cl.
*H04W 36/00* (2009.01)
*H04W 8/22* (2009.01)

(52) U.S. Cl.
CPC ...................................... *H04W 8/22* (2013.01)

(58) Field of Classification Search
CPC .................................................... H04W 36/08
USPC ............................................................ 455/436
See application file for complete search history.

(56) References Cited

U.S. PATENT DOCUMENTS

| | | | | |
|---|---|---|---|---|
| 2012/0002545 A1* | 1/2012 | Watfa | ..................... | H04W 48/06 370/235 |
| 2012/0071163 A1 | 3/2012 | Klingenbrunn | | |
| 2012/0307621 A1* | 12/2012 | Zawaideh | ........... | H04W 76/028 370/216 |
| 2013/0083775 A1* | 4/2013 | Sun | ........................ | H04W 60/00 370/331 |
| 2013/0089048 A1* | 4/2013 | Damnjanovic | .......... | H04L 5/001 370/329 |
| 2013/0195005 A1* | 8/2013 | Al-Shalash | ........... | H04W 36/16 370/315 |
| 2014/0328182 A1* | 11/2014 | Gao | ....................... | H04W 28/08 370/236 |
| 2015/0036566 A1* | 2/2015 | Blankenship | ....... | H04W 52/281 370/311 |
| 2015/0045038 A1* | 2/2015 | Gao | ....................... | H04W 36/22 455/438 |
| 2015/0049753 A1* | 2/2015 | Park | .................. | H04W 56/0045 370/350 |

OTHER PUBLICATIONS

3GPP TS 24.301 V12.2.0, Section 4.5, p. 43-44, Sep. 2013.

\* cited by examiner

*Primary Examiner* — Santiago Garcia
(74) *Attorney, Agent, or Firm* — Winston Hsu; Scott Margo

(57) ABSTRACT

In a wireless communication system, when a user equipment needs to deactivate its E-UTRA function due to a network related failure cause, a waiting period is set according to the mobility information of the user equipment. When the waiting period has elapsed after deactivating the E-UTRA function, the user equipment is configured to reactivate the E-UTRA function.

8 Claims, 2 Drawing Sheets

METHOD OF MANAGING E-UTRA FUNCTION OF USER EQUIPMENT AND RELATED WIRELESS COMMUNICATION SYSTEM

CROSS REFERENCE TO RELATED APPLICATIONS

This application claims priority of U.S. Provisional Application No. 61/911,482 filed on Dec. 4, 2013.

BACKGROUND OF THE INVENTION

1. Field of the Invention

The present invention is related to a method of managing E-UTRA function of user equipment and related communication system, and more particularly, to a method of deactivating and reactivating E-UTRA function according to mobility information of user equipment and related communication system.

2. Description of the Prior Art

The $3^{rd}$ Generation Partnership Project (3GPP) has developed a $3^{rd}$ Generation (3G) network system capable of providing high frequency spectrum utilization, universal coverage, and high-speed/quality multimedia data transmission. Examples of 3G network systems include the universal mobile telecommunications system (UMTS) and the global system for mobile communications edge radio access network (GERAN). In the UMTS, a radio access network known as a universal terrestrial radio access network (UTRAN) includes multiple base stations, commonly known as Node-Bs (NBs), for communicating with multiple user equipment (UE). Furthermore, a $4^{th}$ Generation (4G) network system, also known as long-term evolution (LTE) system, is now being developed by the 3GPP in order to further improve performance of the UMTS to satisfy users' increasing needs. The LTE system includes a new radio interface and radio network architecture which provides a high data rate, low latency, packet optimization, and improved system capacity and coverage. In the LTE system, a radio access network known as an evolved UTRAN (E-UTRAN) includes multiple evolved NBs (eNBs) for communicating with multiple UEs and a core network which includes a mobility management entity (MME), a serving gateway and other devices for NAS (Non Access Stratum) control.

When the E-UTRA function is activated, the user equipment can perform corresponding handover or cell reselection operations in order to switch from the UTRAN/GERAN to the E-UTRAN. According to a 3GPP specification TS 24.301, after deactivating the E-UTRA function, the user equipment is allowed to reactivate the E-UTRA function only after a predetermined waiting period has elapsed. If the length of the waiting period is too long, the user equipment may not be able to use 4G service for a long time, thereby influencing user experience. If the length of the waiting period is too short, the user equipment may repeatedly attempt to connect to a 4G network which has previously rejects the register request of the user equipment, thereby wasting time and power.

SUMMARY OF THE INVENTION

The present invention provides a method of managing an E-UTRA function of a user equipment. The method includes the user equipment activating the E-UTRA function; acquiring mobility information of the user equipment and setting a waiting period according to the mobility information when determining that the E-UTRA function needs to be deactivated; the user equipment deactivating the E-UTRA function; and the user equipment reactivating the E-UTRA function when the waiting period has elapsed after deactivating the E-UTRA function.

The present invention provides a wireless communication system for managing an E-UTRA function. The wireless communication system includes a network and a user equipment. The user equipment includes a network connectivity unit configured to provide the E-UTRA function for registering to the network; a computing unit configured to acquiring mobility information of the user equipment by measuring at least one of a UE mobility state, a UE velocity and a change in the UE mobility state during a specific period; a memory unit configured to store the waiting period; and a processing unit. The processing unit is configured to set the waiting period according to the mobility information; determine if the E-UTRA function needs to be deactivated; instruct the network connectivity unit to deactivate the E-UTRA function; and instruct the network connectivity unit to reactivate the E-UTRA function when the waiting period has elapsed after deactivating the E-UTRA function.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
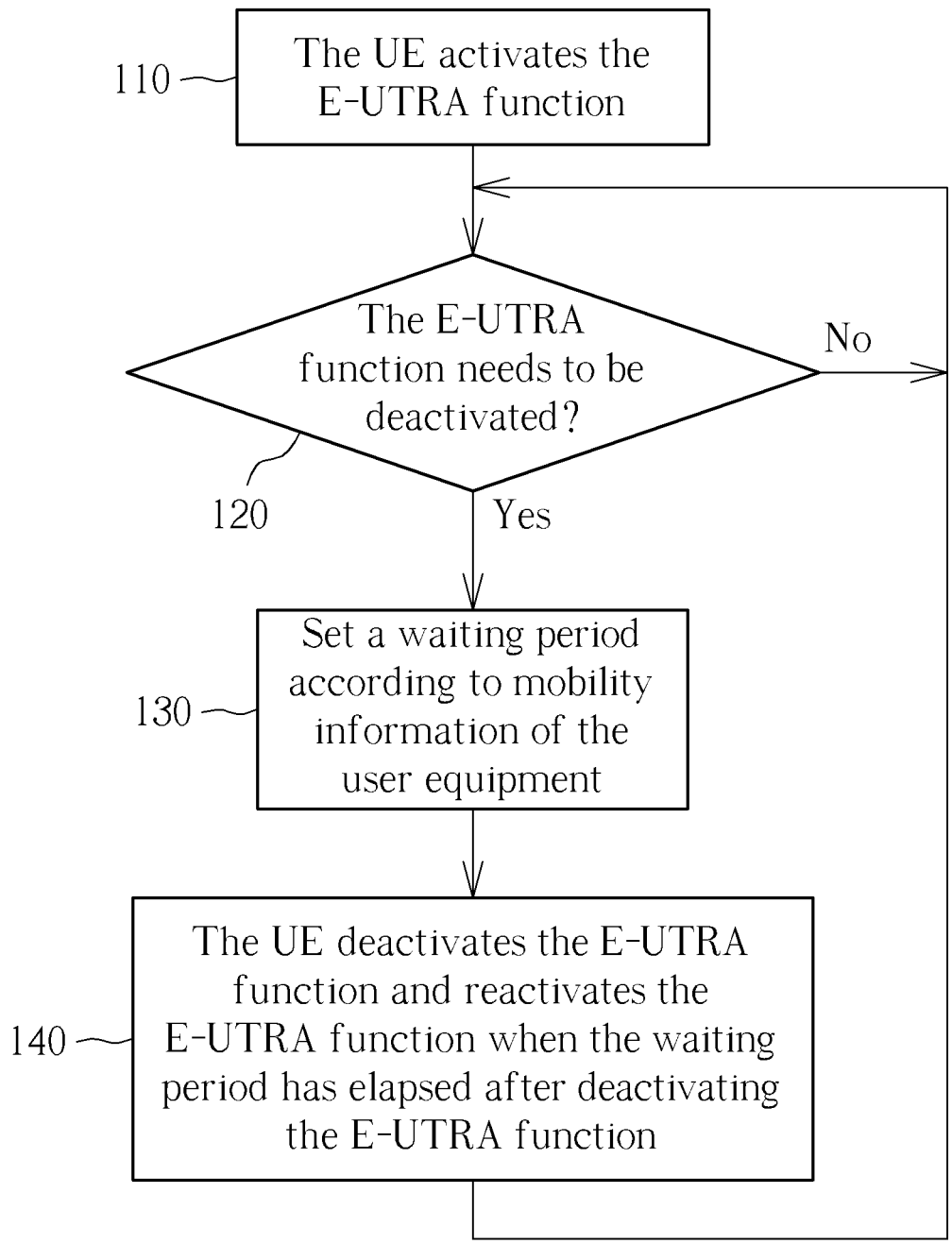
FIG. 1 is a flowchart illustrating a method of managing the E-UTRA function of a user equipment according to an embodiment of the present invention.

FIG. 1 is a flowchart illustrating a method of managing the E-UTRA function of a user equipment according to an embodiment of the present invention. The flowchart in FIG. 1 includes the following steps:

Step: 110: the UE activates the E-UTRA function; execute step 120.

Step: 120: the UE determines if the E-UTRA function needs to be deactivated; if yes, execute step 130; if no, execute step 120.

Step: 130: set a waiting period according to mobility information of the user equipment; execute step 140.

Step: 140: the UE deactivates the E-UTRA function and reactivates the E-UTRA function when the waiting period has elapsed after deactivating the E-UTRA function; execute step 120.

In step 110, the UE may include electronic devices with 3G/4G telecommunication capabilities, such as mobile phones, personal digital assistants, handheld computers, tablet computers, nettop computers, or laptop computers. However, the type of the UE does not limit the scope of the present invention.

In a wireless communication system, the UE may operate in a packet switched (PS) domain or a circuit switched (CS) domain. The 4 operational modes of the user equipment are listed as follows:

(1) PS mode 1: the UE registers only to evolved packet system (EPS) services, and the UE's usage setting is "voice centric";

(2) PS mode 2: the UE registers only to EPS services, and the UE's usage setting is "data centric";

(3) CS/PS mode 1: the UE registers to both EPS and non-EPS services, and the UE's usage setting is "voice centric"; and (4) CS/PS mode 2: the UE registers to both EPS and non-EPS services, and the UE's usage setting is "data centric".

In step 120, it is determined if the E-UTRA function of the UE needs to be deactivated. For example, assume that the UE attempts to register to both EPS and non-EPS services in the CS/PS mode 1. If the UE receives an "IMS (IP multimedia subsystem) voice not available" and a tracking area update message which informs that the UE can only register to EPS services due to network related causes, the UE is required to deactivate the E-UTRA function according to the 3GPP specification 24.301. The purpose of deactivating the E-UTRA function under such circumstance is to prevent the UE from performing unnecessary handover or cell reselection operations and to avoid the meaningless switch from the UTRAN/GERAN to the E-UTRAN.

In step 130, the waiting time may be set according to the mobility information of the user equipment. In the embodiment of the present invention, the mobility information may be the UE mobility state, the UE velocity and/or the change in the UE mobility state which are measured during a specific period.

In the embodiment of the UE mobility state, the UE is configured to measure the reference signal received power (RSRP) or the reference signal received quality (RSRQ) of a source base station and a target base station during the specific period and perform the cell re-selection according to the RSPP or the RSRQ. Thus, the UE may determine if the mobility information corresponds to a high UE mobility state, a medium UE mobility state or a low UE mobility state according to how many times the cell re-selection is executed during the specific period. When determining that the mobility information corresponds to the high UE mobility state (such as when the cell re-selection is executed more than a predetermined number of times during the specific period), the UE is more likely to return to a region which includes a functional E-UTRAN, and the waiting period may be set to T1. When determining that the mobility information corresponds to the medium UE mobility state or the low UE mobility state, the UE is more likely to remain in the same region which does not include any functional E-UTRAN, and the waiting period may be set to T2. In the present invention, T1 is smaller than T2. This way, after deactivating the U-UTRAN function in step 140, it takes a shorter waiting period before a UE in the high UE mobility state is allowed to reactivate the U-UTRAN function for performing appropriate handover or cell reselection operations.

In the embodiment of the UE velocity, the UE is configured to measure its velocity using a standalone global positioning system (GPS), a standalone global navigation satellite system (GNSS), an assisted GPS, an assisted GNSS, a location services (LCS) positioning, or a secure user plane location (SUPL) positioning. When determining that the mobility information corresponds to a fast UE velocity (such as when the velocity of the UE exceeds a predetermined value), the UE is more likely to return to a region which includes a functional E-UTRAN, and the waiting period may be set to T1. When determining that the mobility information corresponds to a medium UE velocity or a slow UE velocity, the UE is more likely to remain in the same region which does not include any functional E-UTRAN, and the waiting period may be set to T2. In the present invention, T1 is smaller than T2. This way, after deactivating the U-UTRAN function in step 140, it takes a shorter waiting period before a UE with fast velocity is allowed to reactivate the U-UTRAN function for performing appropriate handover or cell reselection operations.

In the embodiment of the change in the UE mobility state, the UE is configured to determine if a system information block (SIB) is received from a neighboring base station and by determining if a location area code (LAC) has been changed. For example, according to relevant 3GPP specifications, the system information block SIB19 includes an evolved universal terrestrial radio access absolute radio frequency channel number (EARFCN), and the system information block SI-2Quater includes information associated with neighboring 3G base stations. When receiving the system information block SIB19 or SI-2Quater and determining that the location area code has been changed, the UE is more likely to return to a region which includes a functional E-UTRAN, and the waiting period may be set to T1. When not receiving the system information block SIB19 or SI-2Quater or when determining that the location area code has not been changed, the UE is more likely to remain in the same region which does not include any functional E-UTRAN, and the waiting period may be set to T2. In the present invention, T1 is smaller than T2. This way, after deactivating the U-UTRAN function in step 140, it takes a shorter waiting period before a UE with large change in the UE mobility state is allowed to reactivate the U-UTRAN function for performing appropriate handover or cell reselection operations.

Figure 2:
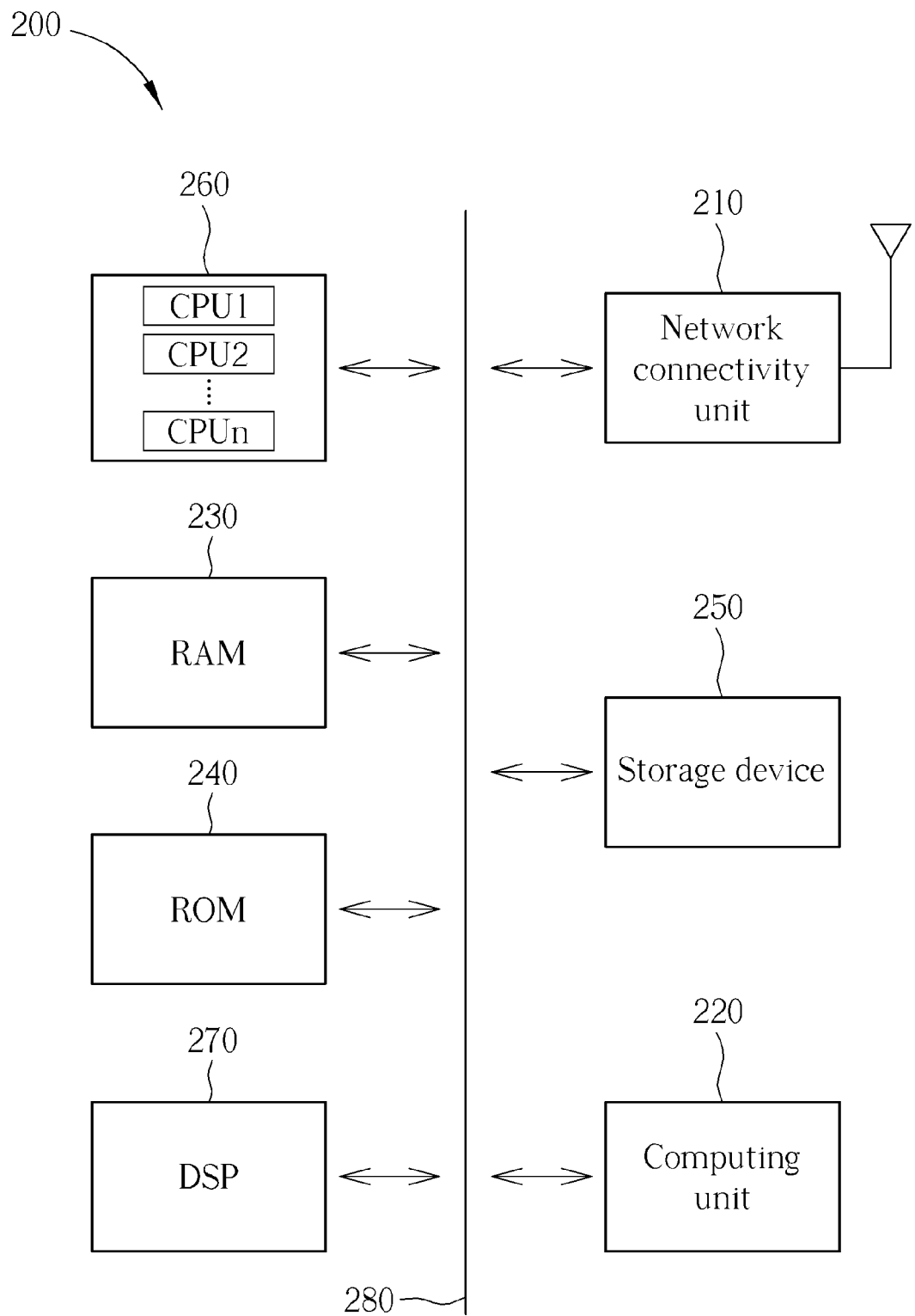
FIG. 2 is a functional diagram illustrating a user equipment configured to perform the method depicted in FIG. 1.

FIG. 2 is a functional diagram illustrating a UE 200 configured to perform the method depicted in FIG. 1 according to the present invention. The UE 200 includes a network connectivity unit 210, a computing unit 220, random access memory (RAM) 230, read only memory (ROM) 240, a storage device 250, a processing unit 260, and a digital signal processor (DSP) 270. These components might communicate with one another via a bus 280. In some cases, some of these components may not be present or may be combined in various combinations with one another or with other components not shown. These components might be located in a single physical entity or in more than one physical entity. Any actions described herein as being taken by the processing unit 260 may be taken by the processing unit 260 alone or by the processing unit 260 in conjunction with one or more components shown or not shown in the drawing, such as with the DSP 270. Although the DSP 270 is shown as a separate component, the DSP 270 might be incorporated into the processing unit 260.

The network connectivity unit 210 may include one or multiple modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM/UMTS/LTE radio transceiver devices, worldwide interoperability for microwave access (WiMAX) devices, and/or other well-known devices for connecting to other network entities. The network connectivity unit 210 allows the processing unit 260 to communicate with the Internet or one or more 3G/4G telecommunication networks. However, the type of the network connectivity unit 210 does not limit the scope of the present invention.

The computing unit 220 is configured to acquire the mobility information of the UE 200. The computing unit 220 may include any device capable of measuring the UE mobility state, the UE velocity and/or the change in the UE mobility state of the UE 200. However, the type of the computing unit 220 does not limit the scope of the present invention.

The RAM 230 may be used to store volatile data and instructions that are executed by the processing unit 260. The ROM 240 may be used to store instructions and data that are read during execution of the instructions. The storage device 250 may include various disk-based systems such as hard disk, floppy disk, or optical disk and may be used to store programs that are loaded into the RAM 230 when such programs are selected for execution. Access to both the RAM 230 and the ROM 240 is typically faster than access to the storage device 250, but the storage device 250 can provide larger memory capacity. In step 130 of the present invention, the value of the waiting period may be stored in the RAM 230, ROM 240 and/or the storage device 250. However, the types of the RAM 230, ROM 240 and the storage device 250 do not limit the scope of the present invention.

The processing unit 260 is configured to execute instructions, codes, computer programs, or scripts which may be accessed from the network connectivity unit 210, the RAM 230, the ROM 240, or the storage device 250. The processing unit 260 may include one or multiple processors CPU1-CPUn for executing the present method simultaneously, serially, or otherwise by one processor. For example, the processing unit 260 may execute the determination in step 120, set the waiting period according to mobility information acquired by the computing unit 220, and instruct the network connectivity unit 210 to activate/deactivate the E-UTRAN function according to steps 120 and 130. However, the type of the processing unit 260 does not limit the scope of the present invention.

In the present invention, when a user equipment needs to deactivate its E-UTRA function due to a network related cause, a waiting period is set according to the mobility information of the user equipment. When the waiting period has elapsed after deactivating the E-UTRA function, the user equipment is configured to reactivate the E-UTRA function. The present invention can dynamically adjust the time to reactivate the E-UTRA function according to real-time mobility information of the user equipment, thereby improving the availability of 4G service and preventing time and power from being wasted on attempting to connect to a 4G network which has previously rejects the register request of the user equipment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing an evolved universal terrestrial radio access (E-UTRA) function of a user equipment (UE), comprising:
the user equipment activating the E-UTRA function;
acquiring mobility information of the user equipment by measuring at least one of a UE mobility state, a UE velocity and a change in the UE mobility state during a specific period;
setting a waiting period according to the mobility information when determining that the E-UTRA function needs to be deactivated;
the user equipment deactivating the E-UTRA function; and
the user equipment reactivating the E-UTRA function when the waiting period has elapsed after deactivating the E-UTRA function, wherein:
the waiting period is set to a first value when the mobility information corresponds to a high UE mobility state, a fast UE velocity or a large change in the UE mobility state;
the waiting period is set to a second value when the mobility information does not correspond to any of the high UE mobility state, the fast UE velocity and the large change in the UE mobility state; and
the first value is smaller than the second value.

2. The method of claim 1, further comprising:
measuring a reference signal received power (RSRP) or a reference signal received quality (RSRQ) of a source base station and a target base station during the specific period;
performing a cell re-selection according to the RSPP or the RSRQ; and
determining that the mobility information corresponds to the high UE mobility state when the cell re-selection is executed more than a predetermined number of times during the specific period.

3. The method of claim 1, further comprising:
measuring the UE velocity using a standalone global positioning system (GPS), a standalone global navigation satellite system (GNSS), an assisted GPS, an assisted GNSS, a location services (LCS) positioning, or a secure user plane location (SUPL) positioning; and
determining that the mobility information corresponds to the fast UE velocity when the UE velocity exceeds a predetermined value.

4. The method of claim 1, further comprising:
measuring a change in the UE mobility state by determining if a system information block is received from a base station and by determining if a location area code has been changed; and
determining that the change in the UE mobility state corresponds to the large change in the UE mobility state when the system information block is received from the base station or the location area code has been changed.

5. The method of claim 4, wherein the system information block includes a SIB19 or a SI-2Quater defined in a 3rd Generation Partnership Project (3GPP) specification.

6. The method of claim 1, wherein it is determined that the E-UTRA function needs to be deactivated when the user equipment is only able to register to one of an evolved packet system (EPS) service and a non-evolved packet system (non-EPS) service after attempting to register to the EPS service and the non-EPS service.

7. A wireless communication system for managing an evolved universal terrestrial radio access (E-UTRA) function, comprising:
a network; and
a user equipment, comprising:
a network connectivity unit configured to provide the E-UTRA function for registering to the network;
a computing unit configured to acquiring mobility information of the user equipment by measuring at least one of a UE mobility state, a UE velocity and a change in the UE mobility state during a specific period;
a memory unit configured to store the waiting period; and
a processing unit configured to:
set the waiting period according to the mobility information;
determine if the E-UTRA function needs to be deactivated;
instruct the network connectivity unit to deactivate the E-UTRA function; and
instruct the network connectivity unit to reactivate the E-UTRA function when the waiting period has elapsed after deactivating the E-UTRA function,
wherein:
the waiting period is set to a first value when the mobility information corresponds to a high UE mobility state, a fast UE velocity or a large change in the UE mobility state;

the waiting period is set to a second value when the mobility information does not correspond to any of the high UE mobility state, the fast UE velocity and the large change in the UE mobility state; and the first value is smaller than the second value.

8. A method of managing an evolved universal terrestrial radio access (E-UTRA) function of a user equipment (UE), comprising:

the user equipment activating the E-UTRA function;

acquiring mobility information of the user equipment and setting a waiting period according to the mobility information when determining that the E-UTRA function needs to be deactivated;

the user equipment deactivating the E-UTRA function; and the user equipment reactivating the E-UTRA function when the waiting period has elapsed after deactivating the E-UTRA function, wherein it is determined that the E-UTRA function needs to be deactivated when the user equipment is only able to register to one of an evolved packet system (EPS) service and a non-evolved packet system (non-EPS) service after attempting to register to the EPS service and the non-EPS service.

* * * * *